United States Patent Office 3,443,892
Patented May 13, 1969

3,443,892
PROCESS FOR PRODUCING CRYSTALLINE ZEOLITES
Klaus Wacks, Friedrichsdorf, Taunus, and Helga Burger, Waldbrol, Germany, assignors to Gebruder Herrmann, Cologne-Ehrenfeld, Germany, a corporation of Germany
No Drawing. Filed Apr. 4, 1967, Ser. No. 628,260
Claims priority, application Germany, Apr. 15, 1966, H 59,125
Int. Cl. C01b 33/28; B01j 1/04
U.S. Cl. 23—113
8 Claims

ABSTRACT OF THE DISCLOSURE

This specification discloses a novel method of making synthetic zeolites, particularly zeolites of the X type. In this method, the reactants, an aqueous solution of a sodium silicate and hydrous, gel-like aluminum phosphate, are individually or singly brought to an elevated temperature and then admixed. As opposed to being heated as in the prior art, the reaction mixture is initially at the reaction temperature and is permitted to cool for a period of time sufficient to produce the appropriate zeolite crystalline configuration. The proportions of reactants are extremely important—the ratio $SiO_2$ to $Na_2O$ must be no greater than 1.

---

It is known that various natural zeolites act as so-called molecular filters, in that they are capable of separating molecules on the basis of their diameter and their polarity, and to a certain degree on the basis of boiling point like conventional adsorbers, or they are capable of co-adsorbing them in a certain ratio.

When the water of crystallization is driven out of the natural zeolites, they do not lose these properties, but they do lose their mechanical strength, so that such products have been manufactured synthetically. On the one hand, binding agents such as kaolin, attapulgite, silicic acid or aluminum oxide are used with synthetic zeolites, thereby eliminating this disadvantage. Furthermore, minerals, especially kaolins, have been transformed by treatment with alkali hydroxide and appropriate mechanical treatment into molecular filters containing no binding agent. These synthetic products retain their high strength even after regeneration, and also they usually have a higher content of water of crystallization which, when driven off, results in a substantially higher absorptive capacity in the activated material.

The manufacture of these materials is performed, as it is generally known, by the hydrothermal crystallization of a hydrous alkali aluminosilicate in the presence of corresponding amounts of alkali hydroxide in a temperature range from 20 to 180° C., followed by a washing treatment or by an ion exchange. The molecular filters that are easiest to manufacture are products made of A-type zeolites.

Products made of X-type zeolites are substantially more difficult to manufacture. Even though the molar ratios required for their formation are used, they often are transformed incalculably during the crystallization process into other zeolites, mainly into those of the natrolite type which are of little or no use as molecular filters. Even though the actual reason has not been mentioned, it is common technical knowledge today that this process can be prevented by the interposition of an aging period; the aging has to be performed at lower temperatures than the crystallization.

It is a fact, though it has never yet been mentioned, that X-type zeolites are very sensitive to the manner in which they are heated and to the mechanical treatment to which they are subjected during the mixing process and during the crystallization period. It is furthermore known that molecular filters made of X-type zeolites are very easily impaired if they are exposed for an extended period to high temperature in a steam atmosphere. For example, a traditionally made zeolite of the X-type, if treated for 17 hours at 450° C. in a steam atmosphere, drops from its average BET surface of 700 square meters per gram to an average BET surface of 180 to 210 square meters per gram.

It is therefore an object of this invention to provide a novel method of making zeolite X.

Other and additional objects of this invention will become apparent from a consideration of this entire specification, including the claims appended hereto.

In accord with and fulfilling these objects, one aspect of this invention resides in a process comprising adding aluminum phosphate, having a water content of about 0.1 to 80 weight percent, to a sodium silicate solution having a $SiO_2$ to $Na_2O$ ratio of up to 1, which is at an elevated temperature above the reaction temperature; and permitting the mixture to stand while cooling for a period of about 1 to 120 hours until the desired zeolite is formed.

The crystalline zeolite product of this invention has the general formula:

$$(0.5 \text{ to } 1.1)Na_2O \cdot Al_2O_3 \cdot (0 \text{ to } 0.2)P_2O_5 \cdot$$
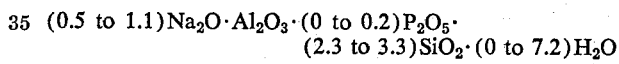
$$(2.3 \text{ to } 3.3)SiO_2 \cdot (0 \text{ to } 7.2)H_2O$$

It is preferred in the practice of this invention to employ sodium ortho- or metasilicate, most preferably the sodium metasilicate, and to utilize a hydrous, gel-like aluminum phosphate. The water content of the aluminum phosphate reactant is preferably about 30 to 50 weight percent, most preferably about 40 weight percent. The temperature of the sodium silicate solution is generally about 98° C. to about the boiling point of this solution, preferably the boiling point. The reaction time is preferably 17 to 24 hours.

After addition of the aluminum phosphate to the sodium silicate, the reaction mass is permitted to stand with no addition or external forced extraction of heat. Thus, the reaction mixture is permitted merely to stand and cool of its own volition for at least one hour, as noted above, while the reaction mass reduces through temperatures of about 150° C. to about 20° C. as the desired zeolite is formed. It is considered desirable in the practice of this invention to provide an insulating jacket about the reaction mass in order to impede the cooling thereof. It is further considered that heating of the reaction mass during the above referred to period of time, by means of a steam coil or steam jacket, for example, is superfluous and of no significant benefit.

This process differs additionally from those known hitherto in that, even outside of the ranges known hitherto, it leads to the formation of a molecular filter of X-type zeolite, whereas otherwise, in the ranges applicable to an A-type zeolite, no corresponding molecular filter is formed.

Furthermore, the use of a gel-like aluminum phosphate simultaneously brings a phosphorus ion ($P_2O_5$) into the solution, which gives the crystalline product an extraordinary thermal stability.

The sodium ion in the zeolite molecular filter can be exchanged with another ion that is capable of exchange.

The disadvantages of the prior-art processes are avoided by following the technically simple method described herein which differs from the prior-art methods in the following ways:

(1) No hydrous amorphous metallic aluminosilicate is manufactured as the starting product.

(2) A precisely defined silicate is required for the development of the crystalline product.

(3) The crystallization takes place without the presence of alkali hydroxide. However, it is possible to add alkali hydroxide in the usual manner, though it brings no advantage.

(4) The mixing of the components is performed at the crystallization temperature, so that any heating, which might result in the development of undesired zeolites, is eliminated.

The stability of the zeolite surface is shown by the fact that a zeolite manufactured by the described method had a BET surface of 886 m.$^2$/g., which was reduced by the previously mentioned heat-and-steam test only to 866 m.$^2$/g., and it must be considered that a difference of 20 m.$^2$/g. comes within the margin of error of the BET method with these materials.

The following examples are illustrative of the practice of this invention without being in any manner limiting upon the spirit and scope thereof, and illustrate the improvements obtained by the practice hereof.

EXAMPLE 1

100 g. of aluminum phosphate having a moisture content of 40% was stirred into a boiling solution of 410 grams of sodium metasilicate 5-hydrate in 2 liters of water. To produce a zeolite molecular filter, the solution was kept at 100° C. Crystallization time: 24 hours.

EXAMPLE 2

100 g. of aluminum phosphate having a moisture content of 40% was precipiatated, powedered and stirred into a solution of 410 grams of sodium metasilicate 5-hydrate in 3.5 liters of water. Crystallization time: 24 hours.

EXAMPLE 3

100 g. of aluminum phosphate having a moisture content of 40% was precipitated, powedered and stirred into a solution of 80 grams of sodium hydroxide and 410 grams of sodium metasilicate 5-hydrate in 3 liters of water. Crystallization time: 17 hours.

EXAMPLE 4

165 g. of aluminum phosphate having a moisture content of 40% was stirred into a boiling solution of 184 grams of sodium orthosilicate in 3 liters of water. Crystallization time: 17 hours.

EXAMPLE 5

165 g. of aluminum phosphate having a moisture content of 40% was stirred into a boiling solution of 450 grams of sodium metasilicate 5-hydrate in 3.750 liters of water. Crystallization time: 24 hours.

EXAMPLE 6

155 g. of aluminum phosphate having a moisture content of 40% was stirred into a boiling solution of 450 grams of sodium metasilicate 5-hydrate in 3.750 liters of water. Crystallization time: 67 hours.

EXAMPLE 7

135 g. of $AlPO_4$ (9% $H_2O$) was stirred into a boiling solution of 450 grams $Na_2SiO_3 \cdot 5H_2O$ in 3.750 liters $H_2O$. Crystallization time: 25 hours. Benzene absorption: 21.4 weight percent.

EXAMPLE 8

215 g. $AlPO_4$ (50% $H_2O$) was stirred into a boiling solffiution of 360 grams sodium orthosilicate in 3.9 liters of water. Crystallization time: 27 hours. Benzene absorption: 20.4 weight percent.

The crystallized products of the examples listed were removed by filtration and, before drying, were washed with distilled water in each case to a pH value of less than 10, e.g. 9.2, and then activated as usual at a temperature of 450° C.

The capacity of the products of this invention for absorbing benzene serves for their characterization. In the case of a perfect material, this should amount to at least 18% by weight. To determine the absorbency, material that has been activated in an electric furnace is poured at 450° C. under a slow gas current into a glass adsorber, and a benzene and air mixture is passed through at a rate of 6 meters per minute until the weight becomes constant. The air is saturated with benzene at 18±1° C. The customary computation is generally familiar and requires no description.

The following Tables I and II indicate data obtained on the products produced according to the above Examples with respect to benzene absorption.

TABLE I

[Weight percent adsorbed (T=20° C.)]

| Example No. | 1 | 2 | 3 | 4 | 5 | 6 |
|---|---|---|---|---|---|---|
| Isotherms: | | | | | | |
| 20 | 24.4 | 23.8 | 21.0 | 1.0 | 26.0 | 24.0 |
| 40 | 26.0 | 25.0 | 25.2 | 1.0 | 26.4 | 24.0 |
| 60 | 26.0 | 26.0 | 25.4 | 1.8 | 28.0 | 25.0 |
| 80 | 27.0 | 26.6 | 26.4 | 2.4 | 28.0 | 26.6 |
| 100 | 29.0 | 29.6 | 31.0 | 8.4 | 31.6 | 31.0 |

TABLE II

| Example No. | 1 | 2 | 3 | 4 | 5 | 6 |
|---|---|---|---|---|---|---|
| Benzene absorption in weight percent | 19.2 | 19.0 | 16.4 | | 22.2 | 20.7 |

As it appears from the description of the examples, if this method were valid for all molecular filters, a molecular filter of the A-type zeolites should have been produced according to Example 4 on the basis of the state of the prior art.

As the values in the tables show, the end product is an entirely inactive one. On the other hand, however, the product of Example 6, on account of going beyond the optimum crystallization time, should have been a product corresponding no longer to type X, but to another type, mainly the natrolite type.

What is claimed is:

1. Process for producing a crystalline, zeolitic molecular filter of the formula:

(0.5 to 1.1)$Na_2O \cdot Al_2O_3 \cdot$(0 to 0.2)
$P_2O_5 \cdot$(2.3 to 3.3)$SiO_2 \cdot$(0 to 7.2)$H_2O$ which comprises heating an aqueous solution of a sodium silicate having a ratio of $SiO_2$ to $Na_2O$ of up to about 1 to a temperature up to about the boiling point of said solution; adding a hydrous, gel-like aluminum phosphate to said heatetd solution; and permitting said mixture to stand for about 1 to 120 hours until the formation of said zeolite is accomplished.

2. Process claimed in claim 1 wherein said silicate is at least one selected from the group consisting of sodium ortho silicate and sodium meta silicate.

3. Process claimed in claim 2 wherein said silicate is sodium meta silicate pentahydrate.

4. Process claimed in claim 1 wherein said aluminum phosphate has a water content of about 0.1 to 80 weight percent.

5. Process claimed in claim 1 wherein said aluminum phosphate has a water content of about 30 to 50 weight percent.

6. Process claimed in claim 1 wherein said aluminum phosphate has a water content of about 40 weight percent.

7. Process claimed in claim 1 wherein the zeolite product is washed with water until a basicity of a pH of less than about 10 is obtained.

8. Process claimed in claim 1 wherein the zeolite product is subjected to ion exchange to replace the sodium ion thereof with another ion.

References Cited

UNITED STATES PATENTS

| | | | |
|---|---|---|---|
| 2,882,244 | 4/1959 | Milton | 23—113 |
| 2,979,381 | 4/1961 | Gottstine et al. | 23—113 |
| 3,355,246 | 11/1967 | Kuehl | 23—113 |
| 3,386,801 | 6/1968 | Kuehl | 23—113 X |

FOREIGN PATENTS

| | | |
|---|---|---|
| 984,505 | 2/1965 | Great Britain. |

EDWARD J. MEROS, Primary Examiner.

U.S. Cl. X.R.

23—111